United States Patent
Schirmer

(10) Patent No.: US 11,673,378 B2
(45) Date of Patent: Jun. 13, 2023

(54) CRYSTAL CLEAR HIGH BARRIER THERMOFORMED PLASTIC BOTTLE

(71) Applicant: Henry G. Schirmer, Spartanburg, SC (US)

(72) Inventor: Henry G. Schirmer, Spartanburg, SC (US)

( * ) Notice: Subject to any disclaimer, the term of this patent is extended or adjusted under 35 U.S.C. 154(b) by 0 days.

(21) Appl. No.: 17/885,695

(22) Filed: Aug. 11, 2022

(65) Prior Publication Data

US 2022/0402251 A1   Dec. 22, 2022

Related U.S. Application Data

(63) Continuation-in-part of application No. 17/508,612, filed on Oct. 22, 2021, which is a continuation-in-part
(Continued)

(51) Int. Cl.
*B32B 27/08*   (2006.01)
*B29C 55/00*   (2006.01)
(Continued)

(52) U.S. Cl.
CPC ............ *B32B 27/08* (2013.01); *B29C 51/002* (2013.01); *B29C 51/10* (2013.01); *B29C 55/005* (2013.01);
(Continued)

(58) Field of Classification Search
CPC ..... B32B 27/08; B32B 27/306; B32B 27/308; B32B 27/325; B32B 27/36; B32B 27/02;
(Continued)

(56) References Cited

U.S. PATENT DOCUMENTS 3,153,813 A * 10/1964 Swick .................... B29C 51/18
  425/398
3,600,488 A   8/1971 Yazawa
(Continued)

FOREIGN PATENT DOCUMENTS

CN   1251856   4/2006
CN   103358524   12/2015
(Continued)

OTHER PUBLICATIONS

Advertisement, "Glacier-Flex III", http://www alphamarathon.biz/alpha-exclusive-technologies/glacier-flex-iii.html, Feb. 4, 2019.
(Continued)

*Primary Examiner* — Vincent Tatesure
(74) *Attorney, Agent, or Firm* — Maxwell J. Petersen; FisherBroyles, LLP

(57) ABSTRACT

A transparent thermoformed high barrier plastic bottle is provided for use in storing food and beverages, personal care products, health care products, and other applications that require excellent transparency and barrier properties. The transparent thermoformed high barrier plastic bottle includes first and second outer layers formed using a transparent polyester or polyester copolymer; an inner nanolayer sequence including a plurality of nanolayers a) including ethylene vinyl alcohol, alternating with nanolayers b) including at least one of ethylene ethyl acrylate, low density polyethylene and linear low density polyethylene, each of the nanolayers b) having a degree of crystallinity less than about 45%; and adhesive layers between each of the two outer layers and the inner nanolayer sequence. A method for producing a transparent thermoformed high barrier plastic bottle is also provided.

33 Claims, 5 Drawing Sheets

Related U.S. Application Data of application No. 17/504,769, filed on Oct. 19, 2021, which is a continuation-in-part of application No. 17/231,062, filed on Apr. 15, 2021, now abandoned.

(60) Provisional application No. 63/123,588, filed on Dec. 10, 2020, provisional application No. 63/116,965, filed on Nov. 23, 2020.

(51) Int. Cl.
| | |
|---|---|
| B29C 51/10 | (2006.01) |
| B29C 51/00 | (2006.01) |
| B32B 27/32 | (2006.01) |
| B32B 27/36 | (2006.01) |
| B32B 27/30 | (2006.01) |
| B32B 37/02 | (2006.01) |
| B32B 7/12 | (2006.01) |
| B29L 31/00 | (2006.01) |
| B29K 23/00 | (2006.01) |
| B29K 33/00 | (2006.01) |

(52) U.S. Cl.
CPC .......... *B32B 7/12* (2013.01); *B32B 27/306* (2013.01); *B32B 27/308* (2013.01); *B32B 27/325* (2013.01); *B32B 27/36* (2013.01); *B32B 37/02* (2013.01); *B29K 2023/0633* (2013.01); *B29K 2023/086* (2013.01); *B29K 2033/08* (2013.01); *B29K 2867/003* (2013.01); *B29L 2031/7158* (2013.01); *B32B 2250/05* (2013.01); *B32B 2250/24* (2013.01); *B32B 2250/40* (2013.01); *B32B 2250/42* (2013.01); *B32B 2250/44* (2013.01); *B32B 2270/00* (2013.01); *B32B 2307/42* (2013.01); *B32B 2307/702* (2013.01); *B32B 2307/704* (2013.01)

(58) Field of Classification Search
CPC ..... B29C 51/002; B29C 51/10; B29C 55/005; B29C 55/23; B29C 55/04; B29C 48/185; B29C 48/19; B29C 48/0018; B29D 7/01
USPC .............................................. 428/36.91, 515
See application file for complete search history.

(56) References Cited

U.S. PATENT DOCUMENTS

| | | | |
|---|---|---|---|
| 3,648,995 A | 3/1972 | Seyfried | |
| 3,663,134 A | 5/1972 | Coquelin | |
| 3,887,613 A | 6/1975 | Sato | |
| 3,904,334 A | 9/1975 | Yazawa | |
| 4,115,047 A | 9/1978 | Stelmack | |
| 4,451,512 A * | 5/1984 | Yazaki ................. | B65D 1/0215 215/373 |
| 9,017,053 B2 | 4/2015 | Rubbelke | |
| 10,435,526 B2 | 10/2019 | Liao | |
| 2007/0187856 A1 | 8/2007 | Kitaju | |
| 2009/0291284 A1 | 11/2009 | Frauenhofer | |
| 2013/0243894 A1 | 9/2013 | Schirmer | |
| 2014/0030373 A1 | 1/2014 | Grattan | |
| 2015/0111092 A1 | 4/2015 | Janousek | |
| 2015/0360450 A1 | 12/2015 | Barbaroux | |
| 2020/0298459 A1 | 9/2020 | Schirmer | |
| 2022/0161478 A1 | 5/2022 | Schirmer | |
| 2022/0161529 A1 | 5/2022 | Schirmer | |

FOREIGN PATENT DOCUMENTS

| | | |
|---|---|---|
| CN | 102941671 | 3/2016 |
| CN | 103624970 B | 3/2017 |
| CN | 207808448 | 4/2018 |
| CN | 10833647 | 6/2018 |
| DE | 2125903 | 12/1971 |
| DE | 3920194 | 1/1993 |
| DE | 102005010471 | 9/2006 |
| EP | 2639038 | 9/2013 |
| GB | 853460 | 11/1960 |
| JP | H06339986 | 12/1994 |
| JP | H09109247 | 4/1997 |
| JP | 2007210158 | 8/2007 |
| WO | 2011-058072 | 5/2011 |
| WO | 2012159233 | 11/2012 |
| WO | 2018126309 | 7/2018 |

OTHER PUBLICATIONS

Collin, "Collin Medical Line," https://www.collin-solutions.com/en/product-units/medical-line/, Feb. 4, 2019.
Xiao et al., "performamce Comparison of Water-Quench versus Air-quench Blown Films," http://www.beca.com/files/pdf/Karen%20Xiao%20Water%20quenched%20vs%20air%20blown%20PPT.pdf, Feb. 4, 2019.
Product Brochure, "Mylar Polyester Film Optical Properties," Dupont Teijin Films, Jun. 2003.
Omnexus, Plastics & Elastomers: Transparency https://omnexus.speciachem.com/polymer-properties/properties/transparency, 2021.
Eastman Technical Data Sheet for Eastman SPECTAR Copolyester 14471 (2019).
Wang et al., "Light Transmission and Haze of Polyethylene Blown Thin Films," Polymer Engineering and science. Feb. 2001, vol. 41, No. 2, pp. 358-372 (2001).
Holzleitner Elektrogerate GmbH & Co. KG, "Finally, the First Commercial Thermoformed Bottles," https://trends.directindustry.com/project-1533.html, downloaded Aug. 2, 2022.
Anton Steeman, "Manfacturing Bottles by Thermoforming Film Material," Best in Packaging, Jan. 22, 2012, https://bestinpackaging.wordpress.com/2012/01/22/manufacturing-bottles-by-thermoforming-film-material/. downloaded Aug. 2, 2022.
TWI Ltd., "What Is PETG? (Everything You Need to Know)," https://www.twi-global.com/technical-knowledge/faqs/what-is-petg, Jul. 20, 2021.
Plastics Technology, "Make Bottles by Vertical Thermoforming," Mar. 31, 2015, https://www.ptoonlone.com/articles/make-bottles-by-vertical-thermoforming.
Science Direct, "Cyclic Olefin—An Overview," https://www.sciencedirect.com/topics/chemistry/cyclic-olefin, downloaded Aug. 9, 2022.
Plastics Today, "Medical Plastics 101: Cyclic Olefin Copolymer Fulfills Complex Medtech Performance Requirements,"Feb. 2, 2021, https:www.plasticstoday.com/medical/medical-plastics-101-cyclic-olefin-copolymer-fulfills-comploex-medtech-performance, downloaded Aug. 9, 2022.

* cited by examiner

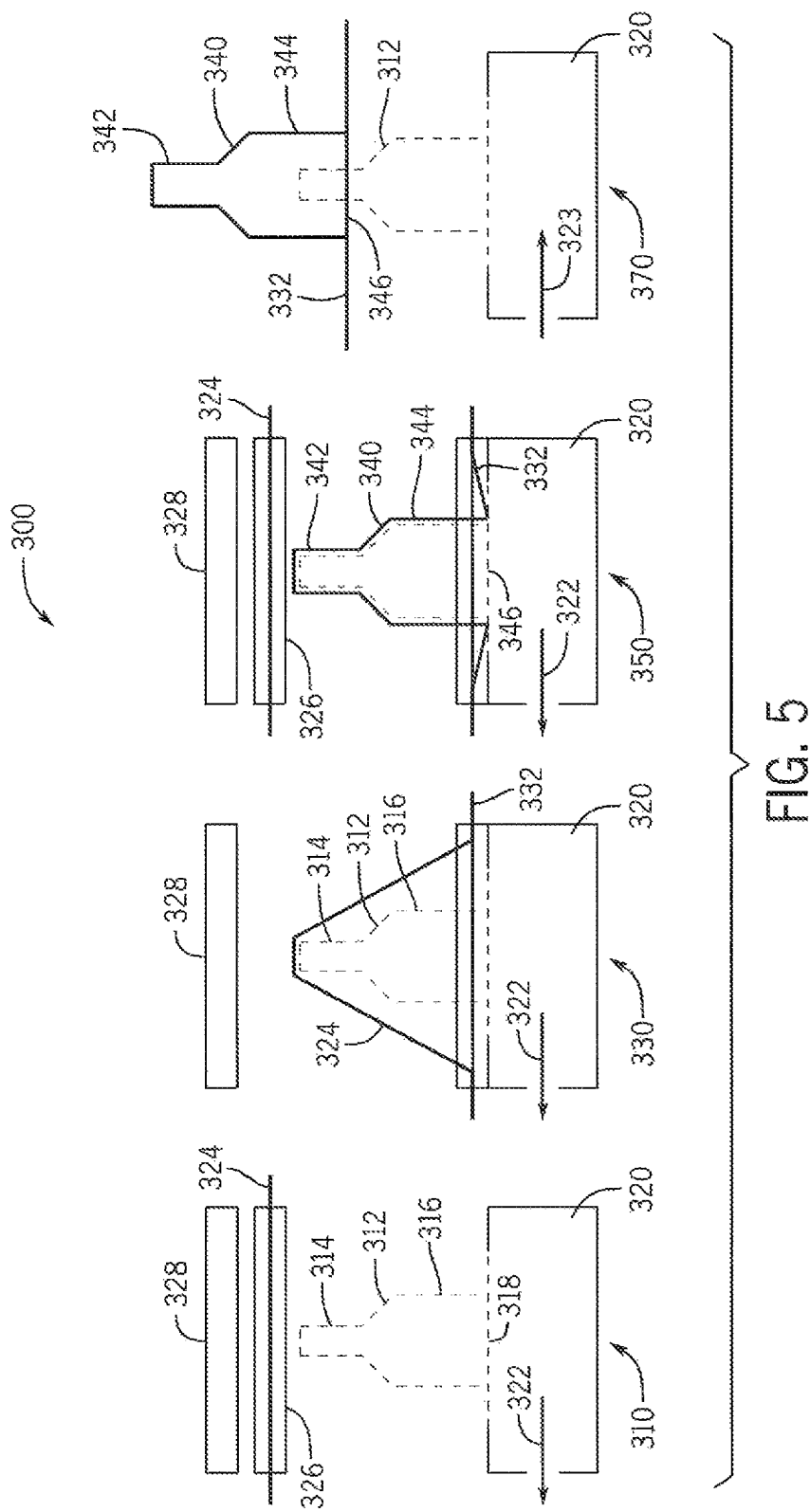

CRYSTAL CLEAR HIGH BARRIER THERMOFORMED PLASTIC BOTTLE

RELATED APPLICATIONS

This patent application is a continuation-in-part of U.S. patent application Ser. No. 17/508,612, filed Oct. 22, 2021, which in turn is a continuation-in-part of U.S. patent application Ser. No. 17/504,769, filed on Oct. 19, 2021, which in turn claims priority to U.S. Provisional Application 63/123,588, filed on Dec. 10, 2020, the disclosures of which are incorporated by reference. U.S. patent application Ser. No. 17/504,769, filed on Oct. 19, 2021, is also a continuation-in-part of U.S. patent application Ser. No. 17/231,062, filed on Apr. 15, 2021, and the preceding U.S. Provisional Application 63/116,965, filed on Nov. 23, 2020, the disclosures of which are incorporated by reference. This patent application claims priority to all of the foregoing applications.

FIELD OF THE INVENTION

This invention is directed to a crystal clear high barrier thermoformed plastic bottle useful for food and beverage applications, medical applications, personal care applications, and other high-value bottle applications, and to a method for making a crystal clear high barrier thermoformed plastic bottle.

BACKGROUND OF THE INVENTION

Barrier films are commonly used for food and medical packaging applications that require high resistance to penetration by both moisture and oxygen. Barrier films are commonly made by combining layers of low density polyethylene ("LDPE") or linear low density polyethylene ("LLDPE"), which provide moisture barrier, with layers of polyamide ("PA") and/or ethylene vinyl alcohol ("EVOH"), which provide oxygen barrier. The oxygen barrier materials are hygroscopic and self-absorb moisture from the air, which in turn lowers their oxygen barrier properties. For this reason, the barrier films are usually constructed with the oxygen barrier layer(s) in the center, surrounded and protected by the moisture barrier layers, and joined to the moisture barrier layers using known polymer-based adhesive resins. For example, one simple barrier film structure has the following basic layer sequence: LDPE/Adhesive/EVOH/Adhesive/LDPE. Barrier films can also have a thickness and integrity that renders them thermoformable for the production of barrier containers.

Conventional layer combinations used to provide high barrier to moisture and oxygen often do not provide films with high transparency and clarity. The relative lack of transparency and clarity can result in packages that appear hazy and/or compromised to the consumer and can make the product contained in the package to appear compromised as well. Especially with high-value medical and food packages, it is important to maintain the perception that the product contained therein is clean, fresh and free of blemishes or contamination. There is a need or desire for food and medical packages that provide high barrier to moisture and oxygen without distorting or diminishing the images of the products contained therein.

SUMMARY OF THE INVENTION

The invention includes a high barrier, high transparency multilayer coextruded film that is useful for packaging foods, medical supplies, and other items where high-end performance is desired. The invention is also directed to a high barrier, high transparency, multilayer coextruded shrink film formed by stretch orienting the high barrier, high transparency multilayer coextruded film, and heat shrinkable and heat shrunk packages formed from the shrink film. Additionally, the invention is directed to a transparent, thermoformed high barrier plastic bottle useful for food and beverage applications, medical applications, personal care applications, and other high-value bottle applications, and to a method for making a crystal clear high barrier thermoformed plastic bottle.

The transparent barrier film of the invention combines the high moisture barrier performance of selected ethylene polymers with the high gas barrier performance of ethylene vinyl alcohol in a manner that utilizes a novel selection of low crystallinity layer polymers and film processing conditions to optimize the degree of transparency throughout the film. The resulting high barrier packaging film suitably has a degree of transparency of at least about 80% or higher, measured using ASTM D1746. The high barrier, high transparency shrink film can be formed by stretch orienting the barrier film, for example using a vacuum thermoforming process, and by allowing the stretched (e.g., thermoformed) barrier film to cool in the stretched condition. The stretch oriented film can then be used to form a package, such as a thermoformed package, and can be heated to above the glass transition temperature of the lower melting layer or layers to cause shrinkage of the film around the packaged product.

The transparent, thermoformed high barrier plastic bottle can be made by thermoforming the transparent barrier film. The thermoforming can be performed using a process that is suitable for making plastic bottles. Suitable processes include without limitation vertical thermoforming, vacuum thermoforming, or a combination of the foregoing. In one example, the flat transparent barrier film can be thermoformed over a hollow perforated mold that has the shape of a bottle. The transparent barrier film can be first heated, then drawn over the neck of the bottle=shaped mold. Then, a vacuum can be drawn from inside the mold through perforations in the mold, causing the transparent barrier film to thermoform in the shape of the bottle-shaped mold, forming a seamless bottle that does not yet have a bottom or base. The vacuum can then be discontinued, and compressed air can be applied inside the mold, causing the molded bottle (without base) to lift off the mold. The bottle can then be filled from its open bottom end and the bottom end can ne sealed closed using a flat sheet or a flat portion of the transparent barrier film.

In one embodiment, the invention is directed to a transparent multilayer coextruded barrier film for use in packaging, which includes:

first and second outer layers formed using a transparent amorphous polymer;

an inner nanolayer sequence including a plurality of nanolayers a) including ethylene vinyl alcohol, alternating with a plurality of nanolayers b) including at least one of ethylene ethyl acrylate, ethylene acrylic acid, low density polyethylene and linear low density polyethylene, each of the nanolayers b) having a degree of crystallinity less than about 45%; and adhesive layers between each of the first and second outer layers and the inner nanolayer sequence;

wherein the film has a light transmittance of at least about 80%.

In another embodiment, the invention is directed to a transparent multilayer coextruded barrier film for use in packaging, which includes:

first and second outer layers formed using a polyester copolymer;

an inner nanolayer sequence including a plurality of nanolayers a) including ethylene vinyl alcohol, alternating with nanolayers b) including at least one of ethylene ethyl acrylate and ethylene acrylic acid, and adhesive layers between each of the two outer layers and the inner nanolayer sequence.

In another embodiment, the invention is directed to a transparent multilayer coextruded barrier film for use in packaging, which includes:

first and second outer layers formed using a transparent amorphous polymer;

a first inner nanolayer sequence including at least three nanolayers a) including ethylene vinyl alcohol, alternating with at least three nanolayers b) including an adhesive, each of the nanolayers b) having a degree of crystallinity less than about 45%;

adhesive layers between each of the two outer layers and the first inner nanolayer sequence; and a second inner nanolayer sequence including at least three nanolayers c) including a first low density polyethylene or linear low density polyethylene, alternating with at least three nanolayers d) including a second low density polyethylene or linear low density polyethylene, wherein each of the nanolayers c) and d) has a degree of crystallinity less than about 45%.

In another embodiment, the invention is directed to a transparent multilayer coextruded heat shrinkable barrier film for use in packaging, which includes:

first and second outer layers formed using a transparent amorphous polymer;

an inner nanolayer sequence including a plurality of nanolayers a) including ethylene vinyl alcohol, alternating with a plurality of nanolayers b) including at least one of ethylene ethyl acrylate, ethylene acrylic acid, low density polyethylene and linear low density polyethylene, each of the nanolayers b) having a degree of crystallinity less than about 45%; and adhesive layers between each of the first and second outer layers and the inner nanolayer sequence;

wherein the film has a light transmittance of at least about 80% and a heat shrink of at least about 10 percent in at least one direction.

In another embodiment, the invention is directed to a transparent multilayer coextruded heat shrinkable barrier package, which includes two opposing film segments joined at respective edges, each film segment comprising:

first and second outer layers formed using a polyester copolymer;

an inner nanolayer sequence including a plurality of nanolayers a) including ethylene vinyl alcohol, alternating with nanolayers b) including at least one of ethylene ethyl acrylate and ethylene acrylic acid, and adhesive layers between each of the two outer layers and the inner nanolayer sequence;

wherein the heat shrinkable package has a light transmittance of at least about 80% and a heat shrink of at least about 10 percent in at least one direction.

In another embodiment, the invention is directed to a method of making a transparent multilayer coextruded heat shrinkable barrier package, which includes the steps of:

providing a film including first and second outer layers formed using a polyester copolymer, an inner nanolayer sequence including a plurality of nanolayers a) including ethylene vinyl alcohol, alternating with nanolayers b) including at least one of ethylene ethyl acrylate and ethylene acrylic acid, and adhesive layers between each of the two outer layers and the inner nanolayer sequence;

stretch orienting the film in at least one direction to form a stretch oriented film;

placing a product between two segments of the stretch oriented film; and vacuum sealing the segments of the stretch oriented film at corresponding edges of the segments to form the transparent multilayer coextruded heat shrinkable barrier package;

wherein the heat shrinkable package has a light transmittance of at least about 80% and a heat shrink of at least about 10 percent in at least one direction.

In another embodiment, the invention is directed to a transparent, thermoformed high barrier plastic bottle that includes the following:

first and second outer layers formed using a transparent amorphous polymer;

an inner nanolayer sequence including a plurality of nanolayers a) including ethylene vinyl alcohol, alternating with a plurality of nanolayers b) including at least one of ethylene ethyl acrylate, ethylene acrylic acid, low density polyethylene and linear low density polyethylene, each of the nanolayers b) having a degree of crystallinity less than about 45%; and adhesive layers between each of the first and second outer layers and the inner nanolayer sequence;

wherein the bottle has a light transmittance of at least about 80%.

In another embodiment, the invention is directed to a method of making a transparent, thermoformed high barrier plastic bottle, which includes the following steps:

providing a transparent barrier film including first and second outer layers formed using a polyester copolymer, an inner nanolayer sequence including a plurality of nanolayers a) including ethylene vinyl alcohol, alternating with nanolayers b) including at least one of ethylene ethyl acrylate and ethylene acrylic acid, and adhesive layers between each of the two outer layers and the inner nanolayer sequence;

heating the transparent barrier film;

drawing the transparent barrier film over a neck end of a hollow perforated mold having a shape of a bottle;

drawing a vacuum through perforations in the hollow perforated mold from an interior of the mold, causing the transparent barrier film to thermoform around the hollow perforated mold and form a bottle with an open bottom end;

discontinuing the vacuum and applying compressed gas to the interior of the mold, causing the bottle with open bottom end to discharge from the mold;

filling the bottle with a product through the open bottom end; and closing the bottom end of the bottle by sealing the bottom end with a flat sheet or a flat portion of the transparent barrier film.

In another embodiment, the invention is directed to a method for making a transparent, thermoformed high barrier plastic bottle, including the steps of:

providing an annular film including first and second outer layers formed using a polyester copolymer, an inner nanolayer sequence including a plurality of nanolayers a) including ethylene vinyl alcohol, alternating with nanolayers b) including at least one of ethylene ethyl acrylate and ethylene acrylic acid, and adhesive layers between each of the two outer layers and the inner nanolayer sequence; and thermoforming the annular film to form the transparent, thermoformed high barrier plastic bottle;

wherein the transparent, thermoformed high barrier plastic bottle has a light transmittance of at least about 80%.

In another embodiment, the invention is directed to a transparent, thermoformed high barrier plastic bottle, including:

first and second amorphous outer layers formed using a cyclic olefin copolymer; and a first inner nanolayer sequence including a plurality of nanolayers a) including ethylene vinyl alcohol, alternating with a plurality of nanolayers b) including at least one of ethylene ethyl acrylate and ethylene acrylic acid.

In order to achieve optimal transparency, the multilayer coextruded barrier film can be produced by a blown film process as described herein that utilizes a selection of highly transparent polymers and layer arrangement in a multilayer nanolayer blown film. Alternatively, or in addition to the foregoing, the multilayer coextruded barrier film can be made using a rapid quench process, for example, a water cooling apparatus including a wet porous material in direct contact with the blown film bubble and surrounding an outer circumference of the bubble. The wet porous material continuously wipes the outer circumference of the bubble with water as the bubble moves along the traveling path, providing the blown film with uniform and rapid quenching for optimal transparency. Notwithstanding the foregoing, the water cooling apparatus may not be needed to achieve the desired film transparency if a novel selection of nanolayer polymers and layer arrangement are employed, as described further in this specification.

The transparent multilayer coextruded heat shrinkable barrier film can be produced by stretch orienting the transparent multilayer coextruded barrier film in one or more directions. The orientation of the film can be accomplished using a vacuum thermoforming process, a nip roller process, an inline orientation tenter frame, or another orientation apparatus that stretches the film in one or more directions and allows the film to cool in the stretched state, thereby temporarily "locking in" the orientation of the polymer molecules in one or more layers. The orientation can be performed by stretching the film in one more more directions at a temperature that exceeds the glass transition temperature $T_g$ of the polymer(s) in one or more of the film layers and is typically performed between about 185° F. (85° C.) and about 400° F. (205° C.). "Monoaxial orientation" typically refers to stretch orientation on the machine direction of the film. "Biaxial orientation" typically refers to mutually perpendicular orientations in both the machine and transverse directions. Vacuum thermoforming, by its nature, typically stretches the film in the machine and transverse directions, and at angles that lie in between the machine and transverse directions.

The transparent multilayer coextruded heat shrinkable barrier package can be produced by forming two opposing segments of the heat shrinkable barrier film, sometimes referred to as "halves," and placing a product (for example, a food or medical product) in between the segments. The combination can then be placed in a vacuum and heat sealed at the edges to form the transparent multilayer coextruded heat shrinkable barrier package. The sealed heat shrinkable barrier package can then be heated to a temperature above the glass transition temperature of one or more of the polymer layers, whereupon the polymer molecules return toward their original unoriented molecular state as the film shrinks to form a transparent multilayer coextruded heat shrunk barrier package. Because of its excellent transparency and high barrier properties, the heat shrunk barrier package can be used to contain and store various high-value food and medical products for which an attractive appearance is important to the purchaser.

With the foregoing in mind, it is a feature and advantage of the invention to provide a transparent multilayer coextruded barrier film that combines high barrier properties with high transparency for use in high-value applications, including without limitation high value packaging applications for food and medical devices.

It is also a feature and advantage of the invention to provide a transparent multilayer coextruded barrier film that can be thermoformed and used to provide transparent high-barrier containers for use in high-value applications, including without limitation high value packaging applications for food and medical devices.

It is also a feature and advantage of the invention to provide a heat shrinkable transparent multilayer coextruded barrier film that combines high barrier properties with high transparency for use in high-value packaging applications.

It is also a feature and advantage of the invention to provide a heat shrinkable transparent multilayer coextruded barrier package that combines high barrier properties with high transparency for the packaging of high-value products, such as food and medical products.

It is also a feature and advantage of the invention to provide a transparent thermoformed high barrier plastic bottle that is useful for a variety of food and beverage packing applications, personal care packaging applications, and medical packaging applications.

The foregoing and other features and advantages of the invention will become further apparent from the following detailed description of the invention, read in conjunction with the drawings.

BRIEF DESCRIPTION OF THE DRAWINGS

FIG. 5 is a schematic diagram of a process that can be used to make thermoformed transparent high barrier plastic bottles using the high barrier, high transparency multilayer coextruded films.

DETAILED DESCRIPTION OF THE INVENTION

A. Transparent High-Barrier Packaging Film

Figure 1:
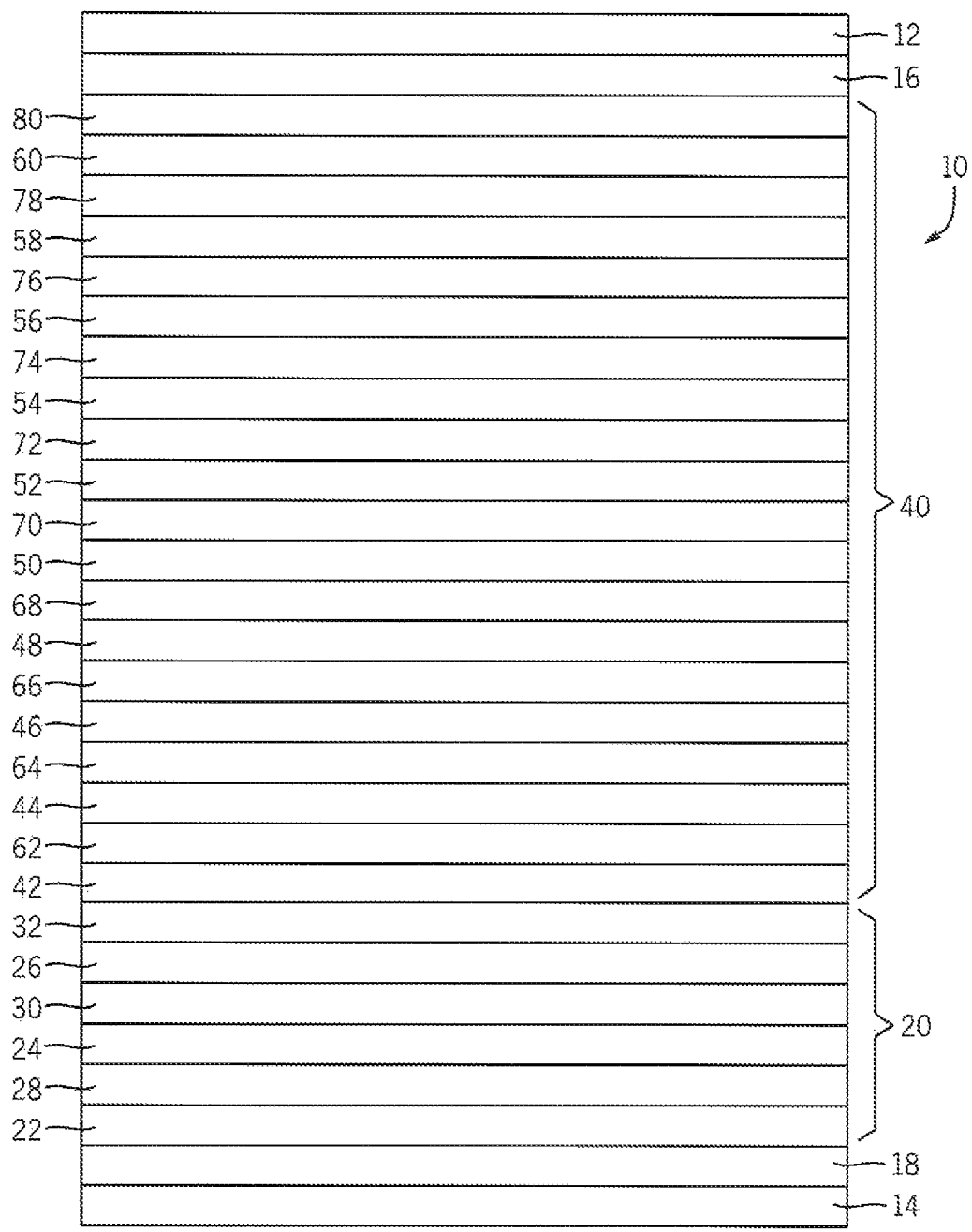
FIG. 1 is a schematic side view of one example of a transparent multilayer coextruded barrier film of the invention that includes 30 nanolayers.

The transparent multilayer coextruded barrier film of the invention employs a combination of optimal material and layer selection and optimal processing to yield a film that has a high level of transparency in addition to excellent barrier to penetration by oxygen and moisture. The nature and importance of the special processing needed to achieve transparency, varies with the selection of polymers and layer arrangement. When optimal film transparency and barrier properties can be achieved through the selection of polymers and layer arrangement, the special processing, namely rapid quenching in the form of water quenching, may not be needed. When special processing via the water quenching process described herein is employed, the polymers and layer arrangement can be varied by a certain amount from what is considered optimal, and the optimal transparency can still be achieved. For purposes of this disclosure, "optimal transparency" or "high transparency" refers to barrier films having a light transmittance of at least about 80%, suitably at least about 84%, or at least about 88%, measured using ASTM D1746.

Multilayer barrier films that can achieve high transparency without requiring special processing include select nanolayer films that include polyethylene terephthalate glycol (PETG) as one or both of the outer layers. PETG is both highly transparent and has excellent heat seal properties. In order for the overall film to have high transparency, it is especially important that one or both outer layers have high transparency and do not possess haze or other surface properties that would inhibit the percent light transmittance of the overall film. PETG is amorphous, having a glass transition temperature of about 80° C. The amorphous nature of PETG not only renders the affected outer layer(s) clear but contributes to making the entire film clear. PETG is also thermoformable and contributes to the thermoformability of the entire film. For enhanced thermoformability, PETG can also be used in one or more inner layers of the barrier film.

Other amorphous polymers that can be used as outer film layers to render inner film layers (and thus, the overall film) clearer include without limitation other amorphous polyesters, polystyrene and polystyrene copolymers, polycarbonate, and transparent acrylic polymers. In general, the selected polymers should have a low crystallinity and a transparency measured as a light transmittance of at least about 80%, or at least about 84%, or at least about 88% determined according to ASTM D1746. While the transparent outer layers can improve the transparency of the overall film by eliminating any haze resulting from surface roughness of adjacent inner layers, it is also desirable to design the inner layers with the maximum possible transparency. This can be accomplished using nanolayers as described below, in which every functional layer (e.g., every gas barrier layer and every moisture barrier layer) is adjacent to another layer that improves the transparency of the functional layer.

The transparent, coextruded multilayer barrier film can also include at least one gas barrier layer or layer combination, and at least one moisture barrier layer or layer combination. The gas barrier layer or layer combination can include ethylene-vinyl alcohol (EVOH), which has gained worldwide recognition for its barrier properties against permeant gases such as oxygen, carbon dioxide and nitrogen. The excellent barrier properties of EVOH can be attributed to the intermolecular and intramolecular bonding caused by the polar hydroxyl groups in the vinyl alcohol units. However, EVOH absorbs water and the water absorption weakens those bonds, causing a decrease in the gas barrier properties. For this reason, EVOH layers in a barrier film should be sandwiched between and protected by moisture barrier layers. For optimal transparency and protection from moisture, the EVOH can be present in multiple nanolayers alternating with relatively transparent, amorphous, low crystallinity moisture barrier nanolayers that also serve as adhesive layers. Ethylene ethyl acrylate (EEA) and ethylene acrylic acid (EAA) are examples of two such moisture barrier polymers that can also serve as adhesive layers. Other suitable moisture barrier nanolayers that provide excellent adhesion between adjacent EVOH nanolayers include blends of EEA or EAA with an anhydride-grafted polyethylene, for example, a modified polyethylene sold under the name PLEXAR®. Such adhesive blends can include from about 10% to about 90% by weight EEA or EAA and about 10% to about 90% by weight anhydride-modified polyethylene, or about 25% to about 75% by weight EEA or EAA and about 25% to about 75% by weight anhydride-modified polyethylene, or about 40% to about 60% by weight EEA or EAA and about 40% to about 60% by weight anhydride-modified polyethylene, or about 50% by weight EEA or EAA and about 50% by weight anhydride-modified polyethylene.

In one embodiment, the transparent, coextruded multilayer barrier film can include a gas barrier nanolayer combination that includes "x" nanolayers of EVOH alternating with nanolayers of adhesive, wherein the adhesive nanolayers are formed of EEA, EAA, a combination of EEA and EAA, or a combination of EEA or EAA with an anhydride-modified polyethylene. For example, the gas barrier nanolayer combination, which is located inside the transparent, multilayer coextruded barrier film, can include the following sequence of layers:

$$(adhesive/EVOH)_x/adhesive$$

where "x" can be at least 3, or at least 4, or at least 5, or at least 6, or at least 7, or at least 8, or at least 9, or at least 10, or at least 15, or at least 20, or at least 25, or at least 30, or at least 35, or at least 40, or at least 45, or at least 50.

The moisture barrier layer or layer combination can also include at least one primary moisture barrier layer or layer combination that provides the film with overall excellent moisture barrier properties, as well as structural integrity. In order to preserve film clarity, the moisture barrier layer or layer combination can include a first low density polyethylene or linear low density polyethylene having low crystallinity, suitably less than about 45%, or less than about 40%, and/or in a range of about 35% to about 40%. The low density or linear low density polyethylene can have a density of about 0.910 to about 0.925 grams/cm$^3$ and can be present as moisture barrier nanolayers. In one embodiment, the nanolayers formed of the first low density or linear low density polyethylene can alternate with nanolayers formed of a second low density or linear low density polyethylene. The second low density polyethylene or linear low density polyethylene can also have low crystallinity, suitably less than about 45%, or less than about 40%, and/or in a range of about 35% to about 40%. The second low density or linear low density polyethylene can have a density of about 0.910 to about 0.925 grams/cm$^3$. The alternating nanolayers of first and second low crystallinity low density or linear low density polyethylene further contribute high transparency to the multilayer coextruded barrier film, along with moisture barrier, strength, and integrity.

In one embodiment, the transparent, coextruded multilayer barrier film can include a moisture barrier nanolayer combination that includes "y" nanolayers of the first low density or linear low density polyethylene ("polyethylene$_1$") alternating with nanolayers of the second low density or linear low density polyethylene ("polyethylene$_2$"). For example, the moisture barrier nanolayer combination, which can be located inside the transparent, multilayer coextruded barrier film, can include the following sequence of layers:

$$(ployethylene_1/polyethylene_2)_y$$

where "y" can be at least 3, or at least 4, or at least 5, or at least 6, or at least 7, or at least 8, or at least 9, or at least 10, or at least 15, or at least 20, or at least 25, or at least 30, or at least 35, or at least 40, or at least 45, or at least 50.

In one embodiment, the gas barrier nanolayer combination can be combined with the moisture barrier nanolayer combination to provide a transparent, coextruded multilayer barrier film that includes amorphous polymer ("AP") outer layers for excellent transparency, heat sealability and thermoformability, and EEA or EAA adhesive (or one of the foregoing adhesive combinations) joining the nanolayer combinations to each other and to the outer layers. For example, the transparent, coextruded multilayer barrier film can include the foregoing sequence of layers:

AP/(EEA or EAA)/moisture barrier nanolayer combination/gas barrier nanolayer combination/AP where the amorphous polymers (AP) are selected from amorphous polyester copolymer (e.g., PETG), polystyrene, polystyrene copolymers, polycarbonate, amorphous acrylic polymers and copolymers, and combinations thereof, and are selected to have a light transmittance of at least about 80%, or at least about 84%, or at least about 88%.

Referring to FIG. 1, an exemplary multilayer coextruded film 10 includes first and second outer layers 12 and 14 which can be formed using an amorphous polymer or polymer combination. Suitable amorphous polymers include those having a light transmittance of at least about 80%, or at least about 84%, or at least about 88%, measured using ASTM D1746. Suitable amorphous polymers that can meet these requirements include without limitation selected amorphous polyester homopolymer or copolymer, polystyrene, polystyrene copolymers, polycarbonate, amorphous acrylic polymers and copolymers, and combinations thereof, and are selected to have a light transmittance of at least about 80%, or at least about 84%, or at least about 88%. Of these, some of the more amorphous copolymers (for example, PETG) can achieve the desired light transmittance without employing the special water quenching techniques described below. Otherwise, the stated light transmittance should not be regarded as an inherent property of the listed polymers and copolymers. Many of them may require the special processing described below to achieve the desired transparency, as measured by light transmittance.

Suitable polyester homopolymers include without limitation polyethylene terephthalate, polybutylene terephthalate, and combinations thereof. Polyester homopolymers provide excellent transparency but are generally not heat sealable. In order to provide the film with heat sealability, one or both of the outer layers can be formed using a polyester copolymer. Suitable polyester copolymers include without limitation polyethylene terephthalate glycol, polyethylene terephthalate-1,4-cyclohexane-2 methyl ester, polyester-polyether block copolymers, and combinations thereof. Polyethylene terephthalate glycol (PETG) is particularly suitable for one or both of the outer layers 12 and 14 because it provides excellent heat sealability and transparency. For optimal transparency, the polyester copolymer can have a degree of crystallinity of less than about 20%, suitably less than about 15%, measured using ASTM D1505. The outer layers 12 and 14, and other film layers described below, should be as thin as possible in order to provide the multilayer coextruded film 10 with maximum transparency. The outer layers 12 and 14 can be nanolayers or microlayers. The term "nanolayers" refers to film layers having thicknesses in the submicron range, typically between about 1 to about 999 nanometers, or about 10 to about 500 nanometers. The term "microlayers" refers to layers having thicknesses of about 1 to about 999 microns, or about 5 to about 500 microns, or about 10 to about 100 microns.

The multilayer coextruded film 10 can also include first and second adhesive tie layers 16 and 18 between the outer layers 12 and 14 and the inner nanolayer sequence(s) described below. The first and second adhesive tie layers can be formed of a soft polymer that exhibits tackiness without compromising film clarity. Suitable soft polymers include without limitation ethylene methyl acrylate, ethylene ethyl acrylate, ethylene acrylic acid, ethylene methacrylic acid, and combinations thereof. Ethylene ethyl acrylate and ethylene acrylic acid are particularly suitable for one or both of the adhesive tie layers 16 and 18 because of their low crystallinity and high clarity. The foregoing adhesives can also be blended with other adhesive materials, such as chemically-modified polyolefins, provided that the desired clarity can be maintained. Suitable chemically-modified polyolefins include without limitation anhydride-modified polyethylene, for example, low density or linear low density polyethylene grafted with maleic anhydride. Examples of suitable chemically-modified polyolefins include those sold under the name PLEXAR® sold by MSI Technology. The chemically-modified polyolefin can improve the adhesion between the polyester homopolymer or copolymer outer layers and the ethylene-vinyl alcohol in the first inner nanolayer sequence described below. The adhesive tie layers can suitably be nanolayers having only the thickness needed to ensure adequate bonding between adjacent layers.

The multilayer coextruded film 10 also includes at least a first inner nanolayer sequence 20 that provides the film 10 with oxygen barrier properties. The first inner nanolayer sequence includes at least one and suitably a plurality of oxygen barrier nanolayers including ethylene-vinyl alcohol (EVOH). In the illustrated embodiment, the first inner nanolayer sequence 20 includes a plurality of nanolayers a) that include EVOH, shown as layers 22, 24 and 26. The nanolayers a) alternate with a plurality of nanolayers b), shown as layers 28, 30 and 32. The nanolayers b) can include at least one of ethylene-ethyl acrylate, ethylene acrylic acid, low density polyethylene and linear low density polyethylene, and should have a degree of crystallinity less than 45%, suitably less than about 40% in order to provide maximum transparency. When the layers b) are formed using ethylene-ethyl acrylate or ethylene acrylic acid, they inherently have low crystallinity and high transparency as explained above. When the nanolayers b) are formed using low density polyethylene or linear low density polyethylene, the materials should be selected to have a crystallinity at the lower end of the conventional range for optimal clarity. Low density and linear low density polyethylene typically have crystallinities ranging from about 35% to about 60%. When used as the layers b), the low density or linear low density polyethylene should be selected to have a crystallinity at the lower end of the normal range, suitably about 35% to about 45%, or about 35% to about 40%, and should have a density of about 0.910 to about 0.925 grams/cm$^3$. The nanolayers b) can also include an amount of anhydride-grafted polyolefin (described above) to provide better adhesion between the nanolayers b) and the EVOH in the nanolayers a).

When the nanolayers b) are formed of low density or linear low density polyethylene, they provide the multilayer coextruded film 10 with additional moisture barrier, strength and integrity. When the density and crystallinity of these materials are sufficiently low as described above, the nanolayers b) can also provide sufficient adhesion between the EVOH layers for some applications. In one alternative embodiment (not illustrated), additional nanolayers ab) formed of an adhesive tie resin can be positioned between the nanolayers a) and b) to provide better bonding strength. The nanolayers ab) can be formed of any of the adhesive materials described above and can suitably include ethylene-ethyl acrylate or ethylene acrylic acid, alone or blended with an anhydride-grafted polyolefin. The first inner nanolayer sequence 20 can include any suitable number of alternating nanolayers a) and b) and (if appropriate) intervening nanolayers ab). For example, the first nanolayer sequence may include at least three nanolayers a), or at least four nanolayers a), or at least five nanolayers a), or at least six nanolayers a), or at least seven nanolayers a), or at least eight nanolayers a), or at least nine nanolayers a), or at least ten nanolayers a), or at least 15 nanolayers a), or at least 20 nanolayers a), or at least 25 nanolayers a), or at least 30 nanolayers a), or at least 35 nanolayers a), or at least 40 nanolayers a), or at least 45 nanolayers a), or at least 50 nanolayers a). The nanolayers a) may alternate with at least three nanolayers b), or at least four nanolayers b), or at least five nanolayers b), or at least six nanolayers b), or at least seven nanolayers b), or at least eight nanolayers b), or at least nine nanolayers b), or at least ten nanolayers b), or at least 15 nanolayers b), or at least 20 nanolayers b), or at least 25 nanolayers b), or at least 30 nanolayers b), or at least 35 nanolayers b), or at least 40 nanolayers b), or at least 45 nanolayers b), or at least 50 nanolayers b).

In one embodiment, the first nanolayer sequence includes layers a) that include EVOH alternating with layers b) that include at least one of ethylene-ethyl acrylate and ethylene acrylic acid. In this embodiment, the multilayer coextruded film 10 can further include a second inner nanolayer sequence 40 as shown in FIG. 1. The second inner nanolayer sequence 40 can be designed to provide the film 10 with improved moisture barrier and structural integrity and can include a plurality of nanolayers c) alternating with a plurality of nanolayers d). The nanolayers c) can include a first low density polyethylene or linear low density polyethylene having low crystallinity, suitably less than about 45%, or less than about 40%, and/or in a range of about 35% to about 40%. The low density or linear low density polyethylene can have a density of about 0.910 to about 0.925 grams/cm$^3$. The nanolayers d) can include a second low density polyethylene or linear low density polyethylene having low crystallinity, suitably less than about 45%, or less than about 40%, and/or in a range of about 35% to about 40%. The low density or linear low density polyethylene can have a density of about 0.910 to about 0.925 grams/cm$^3$. The alternating nanolayers of first and second low crystallinity low density or linear low density polyethylene further contribute high transparency to the multilayer coextruded barrier film, along with moisture barrier, strength and integrity.

The second inner nanolayer sequence 40 can include any suitable number of alternating nanolayers c) and d) and (if appropriate) intervening nanolayers cd) (not shown). For example, the second nanolayer sequence may include at least three nanolayers c), or at least four nanolayers c), or at least five nanolayers c), or at least six nanolayers c), or at least seven nanolayers c), or at least eight nanolayers c), or at least nine nanolayers c), or at least ten nanolayers c), or at least 15 nanolayers c), or at least 20 nanolayers c), or at least 25 nanolayers c), or at least 30 nanolayers c), or at least 35 nanolayers c), or at least 40 nanolayers c), or at least 45 nanolayers c), or at least 50 nanolayers c). The nanolayers c) may alternate with a corresponding number of nanolayers d), for example, at least three nanolayers d), or at least four nanolayers d), or at least five nanolayers d), or at least six nanolayers d), or at least seven nanolayers d), or at least eight nanolayers d), or at least nine nanolayers d), or at least ten nanolayers d), or at least 15 nanolayers d), or at least 20 nanolayers d), or at least 25 nanolayers d), or at least 30 nanolayers d), or at least 35 nanolayers d), or at least 40 nanolayers d), or at least 45 nanolayers d), or at least 50 nanolayers d). In the embodiment illustrated in FIG. 1, the second nanolayer sequence 40 includes ten nanolayers c) identified as nanolayers 42, 44, 46, 48, 50, 52, 54, 56, 58 and 60, alternating with ten nanolayers d) identified as nanolayers 62, 64, 66, 68, 70, 72, 74, 76, 78 and 80.

The nanolayers in the first and second nanolayer sequences 20 and 40 are designed to produce a transparent, high barrier multilayer coextruded film 10 for high-end packaging applications, including without limitation the packaging of food and medical devices. Film clarity is a measure of percent light transmittance and can be measured using ASTM D1746. For example, when a film is exposed to 100% of an incident light source, the transmittance is 100% minus (percent absorption+percent reflection). For optimal performance and appearance, the high barrier multilayer coextruded film 10 should have a light transmittance of at least about 80%, suitably at least about 84%, or at least about 88%.

B. Processes for Making the Transparent High-Barrier Packaging Film

In order to ensure optimal transparency, the high barrier multilayer coextruded packaging film 10 can be manufactured using an upward or downward blown film coextrusion process that includes a rapid quench water cooling ring as described in U.S. Publication 2020/0298459, published to Schirmer on Sep. 24, 2020, the disclosure of which is incorporated by reference. The operation of the water quenching apparatus is briefly described below with respect to FIGS. 2 and 3 and is described in more detail in the foregoing publication.

Figure 2:
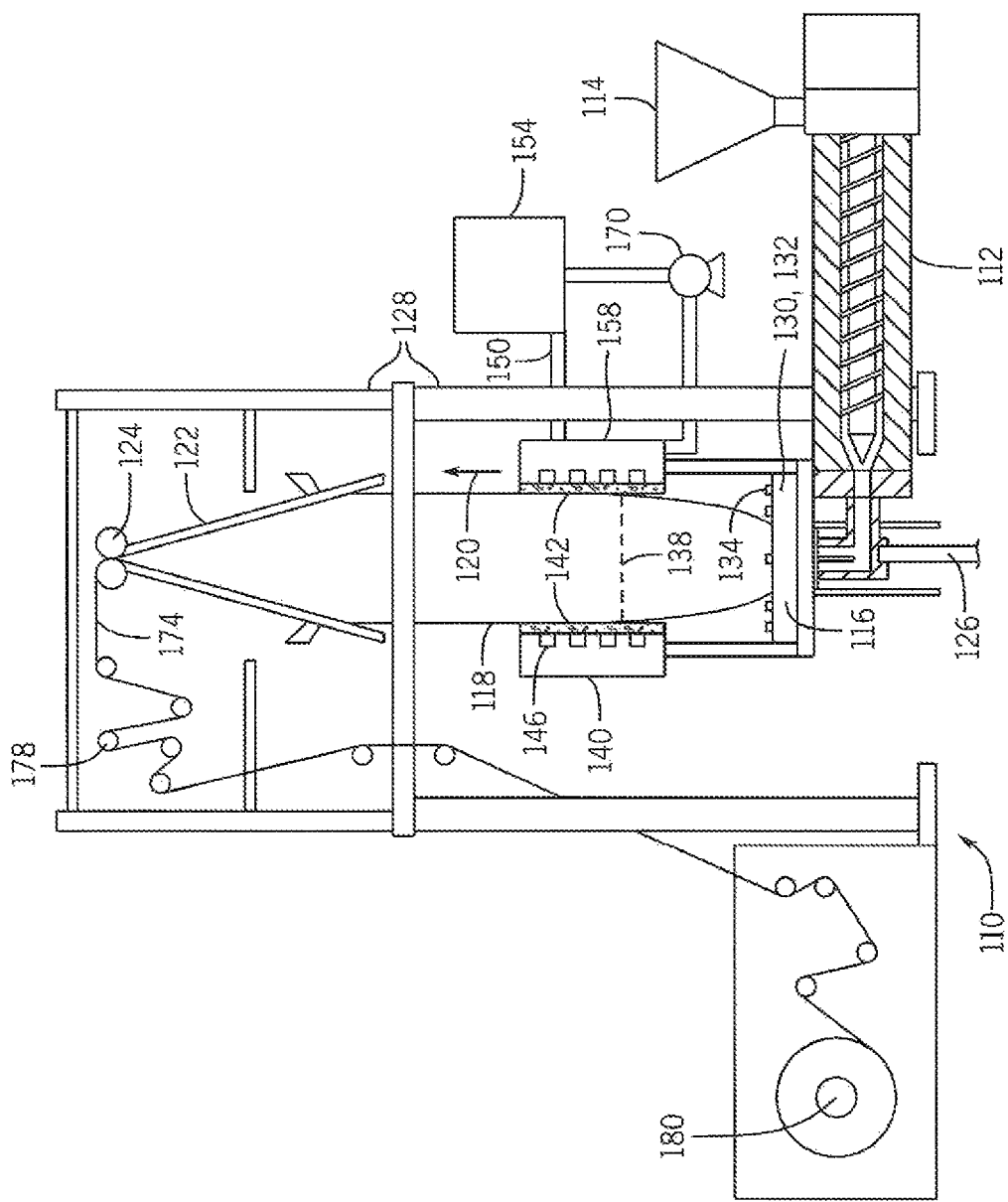
FIG. 2 is a schematic diagram of one example of a blown film line useful to make the high barrier, high transparency multilayer coextruded films of the invention, which is an upward blown film line.
Figure 3:
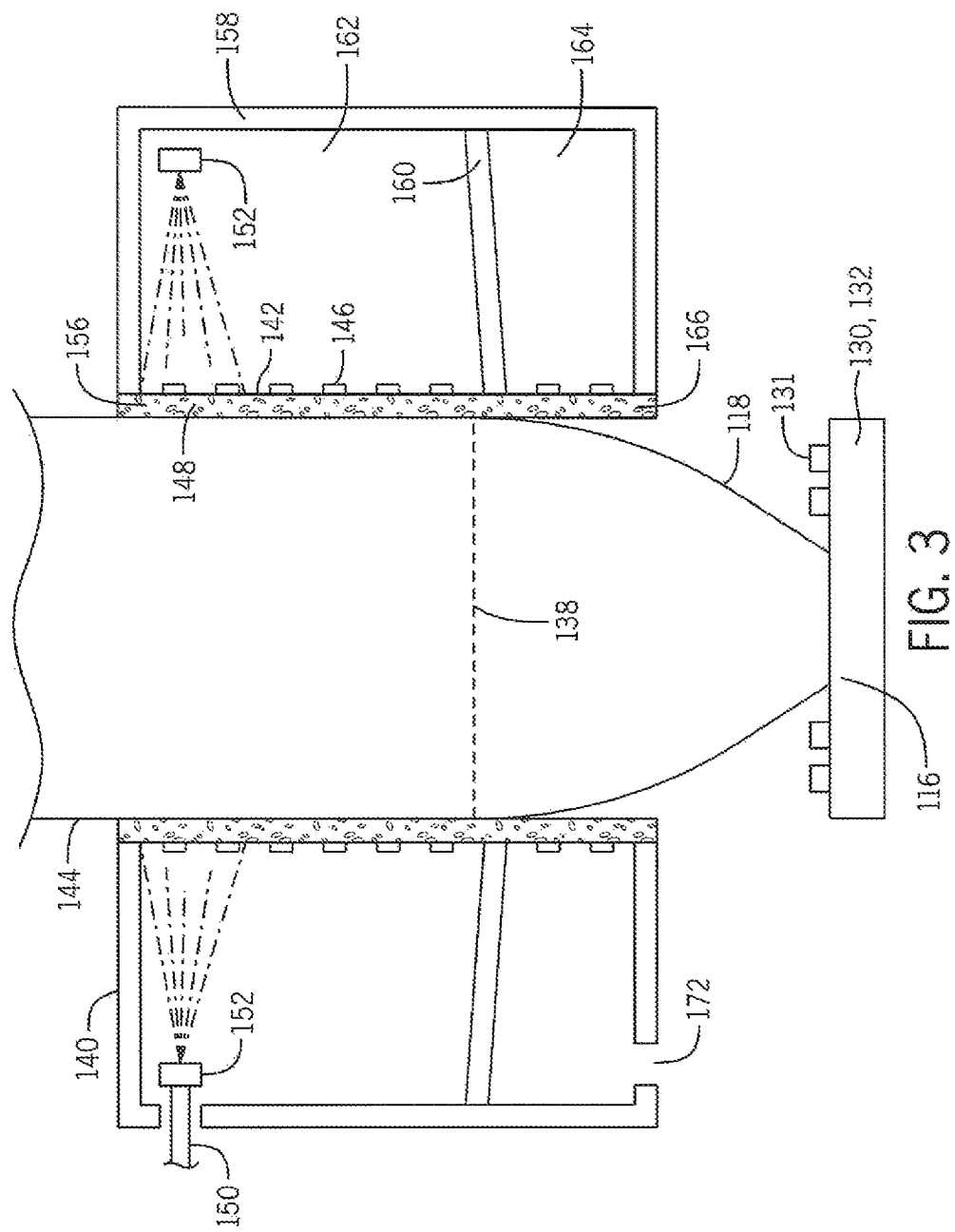
FIG. 3 is an enlarged schematic diagram of the portion of the blown film line of FIG. 1 that illustrates a water cooling apparatus used for optimal clarity.

Referring to FIGS. 2 and 3, a blown film line 110 includes a suitable number of extruders 112, each supplied with plastic resin using a hopper 114. Each extruder 112 melts the associated plastic resin, heats the resin to a desired extrusion temperature, and feeds it to an annular die 116 that is configured to produce a blown film bubble 118 (corresponding to the high barrier multilayer coextruded packaging film 10) having the desired number of layers. The annular die 116 extrudes the blown film bubble 118 in a direction of travel 120 toward a collapsing frame 122 and a plurality of nip rollers 124. A pressure tube 126, positioned below the annular die 116, employs air pressure to inflate the interior of the blown film bubble 118. The blown film line 110 may be mounted for stability to an upright frame 128.

An air cooling apparatus 130, mounted in the vicinity of the annular die 116, includes an air cooling ring 132 that supplies cooling air through a plurality of air vents 134. The air cooling apparatus 130 cools the blown film bubble 118, which is initially molten, to a lower temperature that is closer to its solidification point which appears at the frost line 138 along the direction of travel 120. A water cooling apparatus 140 is provided in the vicinity of the frost line 38, downstream from the air cooling apparatus 130 in the direction of travel 120, and between the air cooling apparatus 30 and the nip rollers 124. The water cooling apparatus 140 includes a wet porous material 142 positioned for direct contact with the blown film bubble 118 and surrounding an outer circumference 144 of the blown film bubble 118, so that the wet porous material 142 continuously wipes the outer circumference 144 of the blown film bubble 118 with water as the blown film bubble 118 moves along the travelling path 120. The wet porous material 142, upon contact with the blown film bubble 118, causes immediate and uniform further cooling of the blown film bubble 118. This rapid and uniform cooling results in a more uniform frost line 138 and a more uniform stretching and thickness of the multilayer blown film and provides the blown film with uniform and optimal clarity.

The wet porous material 142 can be any porous material that is capable of transmitting water through its thickness. The wet porous material 142 can be a cloth or screen and is suitably a mesh screen. In one embodiment, the water cooling apparatus 140 further includes a rigid porous backing 46 supporting the wet porous material 142. In an alternative embodiment, a soft porous material such as one made of polyester fibers or terry cloth can be stitched or otherwise mechanically attached to a mesh screen cylindrical backing using nylon threads or another suitable means of attachment, whereupon the combination of the soft material and mesh screen serves as the wet porous material.

The wet porous material 142 can be maintained in a uniform wet state by supplying an atomized water/air spray mixture to an outside surface 148 of the wet porous material 142. The atomized water/air spray mixture is supplied from a pipe 150 connected to a source 154 and feeds a manifold 152. The manifold 152 can be a single manifold that is circular and surrounds the entire outside surface 48 of an upper portion 156 of the wet porous material 142. Use of a single circular manifold 152, with uniformly spaced spray openings, permits an even distribution of the water/air spray mixture around the circumference of the wet porous material 142. The manifold 152 can be positioned inside a housing 58, which can be cylindrical and can enclose the wet porous material 142 and (if used) the rigid support backing 146. The housing 158 includes a divider 160 that separates an upper chamber 162 of the housing 158 from a lower chamber 164 of the housing 158. The atomized water/air spray mixture is applied continuously in the upper chamber 162 toward the upper portion 156 of the wet porous material 142 as shown.

Some of the water applied to the wet porous material 142 flows downward due to gravity into the lower portion 166 of the wet porous material 142 located in the lower chamber 164. The completely wetted porous material 142 contacts the exterior surface of the blown film bubble 118 as it moves in the direction of travel 120. The effects of this continuous contact are to complete the quenching of the blown film bubble 118 so as to maximize its transparency, while limiting its diameter and blow-up ratio. By controlling the quenching and diameter of the blown film bubble 118 in this fashion, the thickness of the blown film is also controlled more uniformly around the circumference of the blown film bubble 118, thereby reducing or eliminating thickness disparities.

Excess water can be removed from the lower portion 166 of the wet porous material 142 by applying a vacuum to the lower chamber 164 using a vacuum suction device 170, such as a vacuum pump, connected to an outlet 172 leading from the lower chamber 168. The vacuum suction device 170 removes any excess water from the wet porous material so as to maintain the floor and surrounding area in a dry state. Excess water thus removed can be recycled back into the source 154 that supplies the atomized water/air mixture.

The uniformly quenched and sized blown film bubble 118 then passes to the collapsing frame 122 and nip rollers 124, where the bubble 118 is collapsed into a flat film 174. The flat film 174 may be slit on both sides and separated using a slitting apparatus (not shown) to produce the high barrier multilayer coextruded packaging film 10.

Special coextrusion die equipment can also be employed to produce the high barrier multilayer coextruded packaging film 10 as shown and described herein. Suitable die equipment for producing this and other coextruded multilayer blown films having complex nanolayer structures is described in U.S. Pat. No. 11,090,853, issued Aug. 17, 2021, entitled "Modular Disk Coextrusion Die with Opposing Disk Arrangement" and listing Henry Schirmer as the sole inventor. This patent is incorporated by reference. The patent describes and claims a blown film coextrusion die formed using a plurality of cells of thin annular disks that are stacked on top of each other. Each cell includes a central routing disk having at least one flow opening, a first sub-cell on a first side of the central routing disk, and a second sub-cell on a second side of the central routing disk. Each first sub-cell includes a first distribution disk, a first transition disk and a first spreader disk. Each second sub-cell includes a second distribution disk, a second transition disk and a second spreader disk arranged in opposite order to the first sub-cell. Each distribution disk includes a distribution inlet opening, a plurality of outlet openings, and a plurality of channels connecting the distribution inlet opening with the plurality of outlet openings. Within each cell, the distribution inlet opening in the first distribution disk is about 180 degrees opposed to the distribution inlet opening in the second distribution disk.

The opposing disk arrangement enables each cell to produce two nanolayers using oppositely oriented sub-cells that balance the melt streams and pressures and enable the production of very thin uniform layers. The cells and disks within them can be arranged to produce a multilayer coextruded film having a large number of nanolayers and using up to twelve different polymer melt streams, enabling production of complex multilayer nanolayer blown films. Further details of the modular disk coextrusion die with the opposing disk arrangement are provided in the foregoing patent application.

C. Heat-Shrinkable Transparent High-Barrier Packaging Film

The transparent multilayer coextruded multilayer film described in any of the foregoing embodiments can be rendered heat shrinkable by stretch orienting the film in one or more directions using known orientation equipment such as nip rollers, tenter frames, vacuum thermoforming, and other conventional techniques. Uniaxial orientation of the film in the machine direction of the film can be accomplished by stretching the film between two or more successive pairs of nip rollers, wherein each successive pair of nip rollers has a surface velocity that is greater that the surface velocity of the immediately preceding pair. Orientation of the film in the transverse direction can be accomplished using a tenter frame that stretches the film in the transverse direction as the film moves forward in a direction of travel. Biaxial orientation of the film in two mutually perpendicular directions can be accomplished by combining the foregoing techniques. Vacuum thermoforming can be used to stretch orient the film in multiple directions simultaneously by pulling the film, or segments of the film, into the shape of a formed package.

Stretch orienting can be performed at a temperature that is above the glass transition temperature of the lowest melting layer and below the glass transition temperature of the highest melting layer. For example, when the film includes one or both outer layers of PETG, which has a glass transition temperature of about 185° F. (85° C.) and one or more inner layers of EVOH having a glass transition temperature of about 400° F. (205° C.), the stretch orientation can be performed at between these two temperatures. The stretching increases the dimension of the film in the one or more directions of stretching, from a first original dimension to a second, larger stretched dimension, and orients the polymer molecules in the film layers. The film is cooled while being maintained in the stretched state, causing it to maintain the second, larger dimension in the one or more directions of stretching. The resulting heat shrinkable film ("shrink film") can be later heated without the stretching force and caused to "heat shrink" toward its initial, unstretched dimensions.

The amount of heat shrink can be measured using standard test procedures, including ASTM D2838-18. Using this test, the transparent multilayer heat shrinkable barrier film can have a heat shrink of at least about 10% in at least one direction, or at least about 15% in at least one direction, or at least about 20% in at least one direction, or at least about 25% in at least one direction, or at least about 30% in at least one direction. If the film is biaxially stretched in two mutually perpendicular directions such as in the machine and transverse directions, then it may have a heat shrink of at least about 10% in two mutually perpendicular directions, or at least about 15% in two mutually perpendicular directions, or at least about 20% in two mutually perpendicular directions, or at least about 25% in two mutually perpendicular directions, or at least about 30% in two mutually perpendicular directions. The maximum amount of heat shrink generally correlates with the amount of stretching used to produce the stretch oriented film. Heat shrinking reduces the stretch orientation by allowing the film to retract towards its initial pre-stretched dimensions in the absence of a stretching force.

D. Heat Shrinkable Packages Made from the Transparent High-Barrier Film

The transparent multilayer heat shrinkable barrier film thus formed can be formed into segments used to form a package. Two opposing segments, which can be thermoformed into appropriate shapes, can be used to form a transparent multilayer coextruded heat shrinkable barrier package that maintains the transparency and the high barrier properties of the film. A product, for example a high value food or medical product, can be positioned in between the two opposing segments, which are sometimes referred to as "halves" The halves can be previously uniaxially or biaxially oriented, and/or thermoformed into a shape, as explained above. The opposing segments can then be heat sealed at their respective edges, suitably in the presence of a vacuum, to form a sealed package that is free of oxygen and air. The sealed package can then be heated in the absence of a stretching force at a temperature up to the original stretching temperature, causing the molecular orientations to relax, whereupon the film segments or halves retract and shrink toward their original unstretched dimensions.

Figure 4:
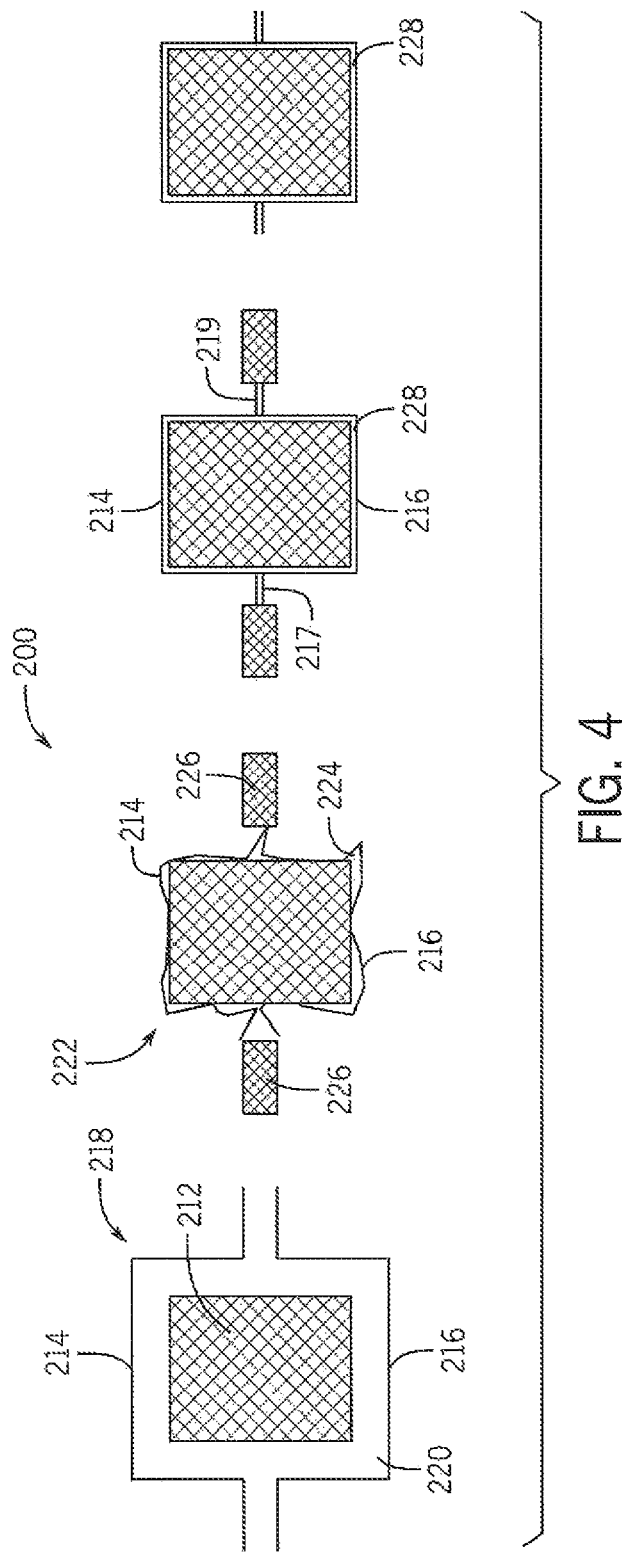
FIG. 4 is a schematic diagram of a process used to convert a stretch oriented transparent multilayer coextruded barrier film into a heat shrinkable transparent multilayer coextruded barrier package and a corresponding heat shrunk transparent multilayer coextruded barrier package.

FIG. 4 shows an exemplary process 200 for forming a transparent multilayer coextruded heat shrinkable barrier package and a corresponding heat shrunk barrier package from a transparent multilayer coextruded heat shrinkable barrier film of the invention. A product 212, which can be a medical or food product, is positioned between two stretch-oriented (e.g., thermoformed) film segments shown in side view as upper half 214 and lower half 216 at station 218 to form a combination 220. The resulting combination 220 is moved to a vacuum sealing station 222, where the edges of the opposing film segments 214 and 216 are heat sealed together using one or more heat sealers 226 in the presence of vacuum to form sealed edges 217 and 219, thereby enclosing the film segments 214 and 216 around the product 212 and forming the transparent multilayer coextruded heat shrinkable barrier package 224. The heat shrinkable barrier package 224 can then be heated in the absence of a stretching force at the sealing station 222 and/or a separate downstream heating station to a temperature above the glass transition temperature of the lowest melting layer and up to the original stretch orienting temperature of the film segments 214 and 216 to relax the molecular orientation in the polymer layers and shrink the film as shown. Because no stretching force is applied at this stage, the heating causes the sealed and stretched film segments 214 and 216 to retract and shrink toward, or at least closer to, their original unstretched dimensions to form a tightly shrink wrapped product. The resulting transparent multilayer coextruded heat shrunk barrier packages 228 maintain the high transparency and barrier properties of the original multilayer coextruded barrier film, resulting in a highly attractive and visually appealing packaged product.

E. Transparent Thermoformed High Barrier Plastic Bottles

It has been discovered that transparent thermoformed high barrier plastic bottles can be produced from the foregoing transparent high barrier multilayer films. In its broadest sense, the layer description of the transparent, thermoformed high barrier plastic bottle can be the layer structure of the film from which the bottle is produced. For example, the transparent, high barrier plastic bottle can include first and second outer layers formed using a transparent amorphous polymer; an inner nanolayer sequence including a plurality of nanolayers a) including ethylene vinyl alcohol, alternating with a plurality of nanolayers b) including at least one of ethylene ethyl acrylate, ethylene acrylic acid, low density polyethylene and linear low density polyethylene, each of the nanolayers b) having a degree of crystallinity less than about 45%; and adhesive layers between each of the first and second outer layers and the inner nanolayer sequence. The bottles can have a light transmittance of at least about 80%, or at least about 84%, or at least about 88%, measured using ASTM D1746.

In one embodiment, the thermoformable high barrier plastic bottles can be formed using the following exemplary method. The first step is to provide any of the foregoing transparent barrier films including first and second outer layers formed using a polyester copolymer, an inner nanolayer sequence including a plurality of nanolayers a) including ethylene vinyl alcohol, alternating with nanolayers b) including at least one of ethylene ethyl acrylate and ethylene acrylic acid, and adhesive layers between each of the two outer layers and the inner nanolayer sequence. The film can then be heated to a thermoforming temperature, which typically exceeds the softening temperature of the lowest melting polymer but does not exceed the melting temperature of the highest melting polymer in the multilayer film structure. In some embodiments, the thermoforming temperature can be between the softening temperature and the melting temperature of the highest melting polymer.

FIG. 5 schematically illustrates one embodiment of a process 300 for making a transparent, thermoformed high barrier plastic bottle. In a first, film heating step 310, a hollow perforated mold 312 can be provided having a neck end 314, a main body 316 (shown as cylindrical in this example), a bottom end 318, and an overall shape that corresponds to the shape of the bottle to be formed. The bottom end 318 may also be perforated or may be completely open and may be positioned above a vacuum box 320 that is capable of maintaining an externally applied vacuum pressure that is pulled in the direction of arrow 322. A section of transparent barrier film 324, which can initially be flat, can be positioned in a holding clamp 326 above the perforated mold 312 and can be heated to a suitable thermoforming temperature using heat from an infrared heater 328 or another suitable source.

In a second, drawing step 330, the heated transparent barrier film 324 can be drawn over the neck end 314 of the hollow perforated bottle mold 312. The drawing step can be aided by the vacuum being pulled through the perforated bottle mold 312 and the vacuum box 320. The section of transparent barrier film 324 may be large enough or may be drawn to dimensions that are large enough to completely cover the necked end 314 and the main body 316 of the mold 312, leaving enough residual film 332 to later close the bottom end of the bottle to be formed.

In a third, vacuum forming step 350, sufficient vacuum can be pulled from inside the perforated bottle mold 312 and the vacuum box 320 to cause the heated transparent barrier film 324 to thermoform around the hollow perforated mold 312 and form a transparent thermoformed plastic barrier bottle 340 with a sealed necked top end 342, a main body 344 and an open bottom end 346. While the bottom end 346 can remain open at this time, the residual film 332 continues to extend from the plastic barrier bottle 340 for subsequent closing of the bottom end 346. In one embodiment, the clamp 326 can at this time be loaded with a second section of the transparent barrier film 324 for heating using the infrared heater 328.

In a fourth, dislodging step 370, the vacuum can be discontinued and compressed gas such as air or nitrogen can be applied to the interior of the mold 312 from the vacuum box 320, from a source of gas that is fed to the box 320 in the direction of arrow 323. This causes the bottle 340 with the open bottom end 346 to dislodge from the mold 312.

The thermoformed plastic bottle 340 can then be filled with a product through the open bottom end 346. The bottom end 346 can then be closed by applying a flat film to the bottom, or by folding the film extension 332 of the transparent barrier film over the open bottom 346, and sealing the flat film or the film extension 332 to the bottom end of the thermoformed barrier bottle. Throughout this process, the necked top end 342 of the bottle 340 remains closed. The necked top end 342 can then be finished by opening the top end and applying a cap, or as otherwise desired.

The resulting transparent, thermoformed high barrier bottle 340 is seamless around the circumference of its main body 344 and can have the appearance of a blow molded bottle. The thermoforming process enables the production of plastic thermoformed high barrier bottles 346 having a wide variety of shapes and sizes because bottle-shaped molds of any shape and size can be used. In one embodiment, the finished bottle 346 can have an elongated cylindrical body 344, a closed bottom end 346, a necked top end 342 that is narrower than the cylindrical body 344, and an opening formed in the necked top end. The top end opening can be provided with a removable cap or a dispensing mechanism. The cylindrical body 44 can have a seamless cross-section. In another embodiment, the finished bottle 340 can have an elongated body 344 with a square or rectangular cross-section, a closed bottom end 346, a necked top end 342 that is narrower than the body 344, and an opening in the necked top end 342. The square or rectangular cross-section can be seamless. Again, the necked top end 342 can be provided with a removable cap or a dispensing mechanism. Other shapes and sized of transparent, thermoformed high barrier bottles can also be made using the transparent barrier films described herein.

Other thermoforming processes can also be used to form the transparent high barrier bottle 340. Such other processes can be employed in addition to or in place of the vacuum thermoforming process illustrated in FIG. 5. For example, a vertical thermoforming process is described in an article entitled, "Make Bottles By Vertical Thermoforming," published in Plastics Technology, Mar. 31, 2015. The described process has been used to form apparently single-layer bottles from polystyrene or polypropylene roll stock. In the described vertical thermoforming process, the sheet stock is first formed into a tube, which is heated and blown in a mold to form a bottle. Air pressure is applied inside the mold to urge the tubular feedstock against the inner wall of the mold to form the bottle. The vertical thermoforming can thus employ a bottle-shaped mold in which the thermoforming takes place inside the mold instead of on an outer surface of the mold.

Various multilayer configurations can also be employed to form the transparent, thermoformed high barrier plastic bottle. As explained above, the transparent, high barrier plastic bottle can include first and second outer layers formed using a transparent amorphous polymer; an inner nanolayer sequence including a plurality of nanolayers a) including ethylene vinyl alcohol, alternating with a plurality of nanolayers b) including at least one of ethylene ethyl acrylate, ethylene acrylic acid, low density polyethylene and linear low density polyethylene, each of the nanolayers b) having a degree of crystallinity less than about 45%; and adhesive layers between each of the first and second outer layers and the inner nanolayer sequence. In various embodiments, the inner nanolayer sequence can include at least three of the nanolayer a) and at least three of the nanolayers b), or at least five of the nanolayers a) and at least five of the nanolayers b), or at least seven of the nanolayers a) and at least seven of the nanolayers b), or higher numbers of nanolayers a) and b).

In certain embodiments of the transparent, thermoformed high barrier plastic bottle, the nanolayers b) can include at least one of ethylene ethyl acrylate and ethylene acrylic acid. These nanolayers b) can have a degree of crystallinity of less than about 20 percent, or less than about 15 percent. In certain embodiments, the nanolayers b) can include at least one of low density polyethylene and linear low density polyethylene. These nanolayers b) can have a degree of crystallinity of less than about 45 percent, or less than about 40 percent, or less than about 35 percent.

In certain embodiments of the transparent, thermoformed high barrier plastic bottle, the amorphous polymer in at least one of the first and second outer layers can include an amorphous polyester copolymer. In some embodiments, the amorphous polyester copolymer in both of the first and second outer layers can include a polyethylene terephthalate glycol. In certain embodiments of the transparent, thermoformed high barrier plastic bottle, the amorphous polymer in at least one of the first and second outer layers can include at least one of an amorphous polystyrene, a polystyrene copolymer, a polycarbonate, and an amorphous acrylic polymer. In some embodiments, the amorphous polymer in both of the first and second outer layers can include at least one of an amorphous polystyrene, a polystyrene copolymer, a polycarbonate, and an amorphous acrylic polymer.

In certain embodiments of the transparent, thermoformed high barrier plastic bottle, the amorphous polymer in at least one of the first and second outer layers can include an amorphous cyclic olefin copolymer. Cyclic olefin copolymers are copolymers of ethylene and norbornene arranged in various repeating sequences in the polymer chain. Cyclic olefin copolymers have low crystallinity and high transparency. In some embodiments, both of the amorphous first and second outer layers can include a cyclic olefin copolymer.

In certain embodiments of the transparent, high barrier plastic bottle, multiple layers of an amorphous polymer may be present. For example, the transparent, high barrier plastic bottle can include multiple layers of polyethylene terephthalate glycol, multiple layers of cyclic olefin polymer, or multiple layers of polyethylene terephthalate glycol combined with multiple layers of cyclic olefin polymer.

In certain embodiments of the transparent, thermoformed high barrier plastic bottle, the adhesive layers between at least one of the first and second outer layers and the inner nanolayer sequence can include at least one of ethylene ethyl acrylate and ethylene acrylic acid. In some embodiments, the adhesive layers between each of the first and second outer layers and the inner nanolayer sequence can include at least one of ethylene ethyl acrylate and ethylene acrylic acid. In certain embodiments of the transparent, thermoformed high barrier plastic bottle, the adhesive layers between at least one of the first and second outer layers and the inner nanolayer sequence can also include an anhydride-grafted polyolefin along with the ethylene ethyl acrylate and/or ethylene acrylic acid. In some embodiments, the adhesive layers between each of the first and second outer layers and the inner nanolayer sequence can also include an anhydride-grafted polyolefin along with the ethylene ethyl acrylate and/or ethylene acrylic acid.

In certain embodiments of the transparent, thermoformed high barrier plastic bottle, the layer structure can also include a second inner nanolayer sequence including a plurality of nanolayers c) including a first low density polyethylene or linear low density polyethylene, alternating with nanolayers d) including a second low density polyethylene or linear low density polyethylene. Each of the nanolayers c) and d) can have a degree of crystallinity less than about 45%, or less than about 40%, or less than about 35%.

F. Cyclic Olefin Copolymers for Thermoformed High Barrier Plastic Bottles

Cyclic olefin copolymers are especially useful as the amorphous polymer outer layers and, where applicable, multiple amorphous polymer inner layers in the transparent, thermoformed high barrier plastic bottles. Cyclic olefin copolymers exceptional barrier to moisture compared to low density and linear low density polyethylene, polyethylene terephthalate glycol, and other polymers that are generally known for moisture barrier. Cyclic olefin copolymers also provide excellent transparency and, when used as the amorphous outer layers, enhance the overall transparency of the thermoformed plastic bottles. The exceptional optical properties of cyclic olefin copolymers are in many ways similar to those of glass.

Cyclic olefin copolymers are chain copolymers of ethylene with cyclic monomers, for example, 8,9,10-trinorborn-2-ene (also known as norbornene) or 1,2,3,4,4a,5,8,8a-octahydro-1,4:5,8-dimethanonaphthalene (also known as tetracyclododecene). The following polymer formula is illustrative of a cyclic olefin copolymer, where x and y can each be integers of 1 or more.

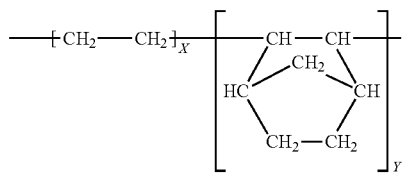

Cyclic olefin copolymers can be produced using known polymerization processes, typically using a transition metal catalyst. Exemplary norbornene contents in the cyclic olefin copolymer can range from about 40 mole percent to about 80 mole percent and number average molecular weights ranging from about 40,000 to about 500,000 grams/mole or higher, often with relatively low polydispersities between about 1.1 and about 3. These properties render the cyclic olefin copolymers useful in a wide variety of coextruded thermoformed bottle applications, including high-value medical and food packaging applications.

Embodiments of the transparent, thermoformed high barrier plastic bottles include those as described above, where the bottle includes amorphous first and/or second outer layers formed using a cyclic olefin copolymer, and at least the first inner layer barrier sequence (and optionally a second inner layer sequence) as described above. Embodiments also include the use of multiple layers of cyclic olefin copolymer in addition to the outer amorphous layers, to provide improved moisture barrier and excellent strength and transparency. In one embodiment, a second inner nanolayer sequence analogous to the one described above can be formed using alternation layers of cyclic olefin copolymer with low density polyethylene or linear low density polyethylene of the types described above. Cyclic olefin copolymers can adhere quite well to these polymers (low density or linear low density polyethylene) during coextrusion so that there is no need for intervening adhesive layers.

Referring to the description of the second nanolayer sequence above, the cyclic olefin copolymer can be used in place of the described first or second layer c) or d) whereby the nanolayers c) can be the cyclic olefin copolymer and the nanolayers d) can be the low density or linear low density polyethylene, or the nanolayers d) can be the cyclic olefin copolymer and the nanolayers c) can be the low density or linear low density polyethylene. As described above with respect to FIG. 1, the second inner nanolayer sequence 40 can include any suitable number of alternating nanolayers c) and d). For example, the second nanolayer sequence may include at least three nanolayers c), or at least four nanolayers c), or at least five nanolayers c), or at least six nanolayers c), or at least seven nanolayers c), or at least eight nanolayers c), or at least nine nanolayers c), or at least ten nanolayers c), or at least 15 nanolayers c), or at least 20 nanolayers c), or at least 25 nanolayers c), or at least 30 nanolayers c), or at least 35 nanolayers c), or at least 40 nanolayers c), or at least 45 nanolayers c), or at least 50 nanolayers c). The nanolayers c) may alternate with a corresponding number of nanolayers d), for example, at least three nanolayers d), or at least four nanolayers d), or at least five nanolayers d), or at least six nanolayers d), or at least seven nanolayers d), or at least eight nanolayers d), or at least nine nanolayers d), or at least ten nanolayers d), or at least 15 nanolayers d), or at least 20 nanolayers d), or at least 25 nanolayers d), or at least 30 nanolayers d), or at least 35 nanolayers d), or at least 40 nanolayers d), or at least 45 nanolayers d), or at least 50 nanolayers d). In the embodiment illustrated in FIG. 1, the second nanolayer sequence 40 includes ten nanolayers c) identified as nanolayers 42, 44, 46, 48, 50, 52, 54, 56, 58 and 60, alternating with ten nanolayers d) identified as nanolayers 62, 64, 66, 68, 70, 72, 74, 76, 78 and 80.

A highly desirable thermoformed barrier bottle having excellent transparency, strength, gas barrier and oxygen barrier can be formed using first and/or second amorphous outer layers formed of cyclic olefin copolymer, a first inner nanolayer sequence having multiple layers a) including ethylene vinyl alcohol alternating with multiple layers b) including ethylene ethyl acrylate or ethylene acrylic acid, and a second inner nanolayer sequence including multiple layers c) of cyclic olefin copolymer alternating with multiple layers d) of linear low density polyethylene or low density polyethylene. The transparent, thermoformed barrier bottles can be used for a variety of medical and food packaging applications, and other applications where a combination of optic, strength and barrier properties are needed or useful.

The embodiments of the invention described herein are exemplary. Various modifications and improvements can be made without departing from the spirit and scope of the invention. The scope of the invention is indicated by the appended claims, and all changes that fall within the meaning and range of equivalents are intended to be embraced therein.

I claim:

1. A method of making a transparent, thermoformed high barrier plastic bottle, which includes the following steps:
   providing a transparent barrier film including first and second outer layers formed using a an amorphous polymer, an inner nanolayer sequence including a plurality of nanolayers a) including ethylene vinyl alcohol, alternating with nanolayers b) including at least one of ethylene ethyl acrylate, ethylene acrylic acid, low density polyethylene and linear low density polyethylene, each of the nanolayers b) having a degree of crystallinity less than about 45%, and adhesive layers between each of the two outer layers and the inner nanolayer sequence;
   heating the transparent barrier film;
   drawing the transparent barrier film over a neck end of a hollow perforated mold having a shape of a bottle; the hollow perforated mold having a perforated narrower neck end, a perforated wider main body, and an open or perforated bottom end;
   drawing a vacuum through perforations in the hollow perforated mold from an interior of the mold, causing the transparent barrier film to thermoform around an exterior of the hollow perforated mold and form a bottle with an open bottom end;
   discontinuing the vacuum and applying compressed gas to the interior of the mold from the open or perforated bottom end of the mold, causing the bottle with open bottom end to discharge from the mold;
   filling the bottle with a product through the open bottom end to form a filled bottle; and
   closing the bottom end of the filled bottle by sealing the bottom end with a flat sheet or a flat portion of the transparent barrier film.

2. The method of claim 1, wherein at least one of the first and second outer layers comprises polyethylene terephthalate glycol or a cyclic olefin copolymer.

3. The method of claim 1, wherein the adhesive layers comprise at least one of ethylene ethyl acrylate and ethylene acrylic acid.

4. The method of claim 1, wherein the transparent barrier film further comprises a second inner nanolayer sequence including a plurality of nanolayers c) including a first low density polyethylene or linear low density polyethylene, alternating with nanolayers d) including a second low density polyethylene or linear low density polyethylene, wherein each of the nanolayers c) and d) has a degree of crystallinity less than about 45%.

5. A method of making a transparent, thermoformed high barrier plastic bottle, comprising the steps of:
   providing an annular film including first and second outer layers formed using a cyclic olefin copolymer or an amorphous polyester copolymer, an inner nanolayer sequence including a plurality of nanolayers a) including ethylene vinyl alcohol, alternating with nanolayers b) including at least one of ethylene ethyl acrylate and ethylene acrylic acid, and adhesive layers between each of the two outer layers and the inner nanolayer sequence; and
   vacuum thermoforming the annular film to form the transparent, thermoformed high barrier plastic bottle;
   wherein the transparent, thermoformed high barrier plastic bottle has a light transmittance of at least about 80%; and the vacuum thermoforming comprises the steps of:
   heating the annular film;
   placing the annular film over an exterior of a hollow perforated mold having a shape of a bottle, the hollow perforated mold having a perforated narrower neck end, a perforated wider main body, and an open or perforated bottom end;
   drawing a vacuum through perforations in the hollow perforated mold from an interior of the mold, causing the annular film to thermoform around the exterior of the hollow perforated mold and form a bottle with an open bottom end; and
   discontinuing the vacuum and applying compressed gas to the interior of the mold from the open or perforated bottom end of the mold, causing the bottle with open bottom end to discharge from the mold, yielding a dislodged bottle; and
   closing the bottom end of the dislodged bottle.

6. The method of claim 1, wherein the amorphous polymer comprises a cyclic olefin polymer.

7. The method of claim 6, wherein the cyclic olefin polymer is present in both of the first and second outer layers.

8. The method of claim 1, wherein the amorphous polymer comprises polyethylene terephthalate glycol.

9. The method of claim 8, wherein the polyethylene terephthalate glycol is present in both of the first and second outer layers.

10. The method of claim 1, wherein the bottle comprises a body having a cylindrical cross-section, a closed bottom end, a necked top end that is narrower than the body, and an opening in the necked top end.

11. The method of claim 1, wherein the bottle comprises a body having a square or rectangular cross section, a closed bottom end, a necked top end that is narrower than the body, and an opening in the top end.

12. The method of claim 1, wherein the bottle has a seamless cross-section.

13. The method of claim 1, wherein the inner nanolayer sequence comprises at least three of the nanolayers a) and at least three of the nanolayers b).

14. The method of claim 1, wherein the inner nanolayer sequence comprises at least five of the nanolayers a) and at least five of the nanolayers b).

15. The method of claim 1, wherein the nanolayers b) comprise at least one of ethylene ethyl acrylate and ethylene acrylic acid and have a degree of crystallinity less than about 20%.

16. The method of claim 15, wherein the nanolayers b) have a degree of crystallinity less than about 15%.

17. The method of claim 1, wherein the nanolayers b) comprise at least one of low density polyethylene and linear low density polyethylene and have a degree of crystallinity less than about 40%.

18. The method of claim 1, wherein the bottle has a light transmission of at least about 84%.

19. The method of claim 1, wherein the bottle has a light transmission of at least about 88%.

20. The method of claim 1, wherein the amorphous polymer is present in multiple layers in addition to the first and second outer layers.

21. The method of claim 20, wherein the multiple layers include a cyclic olefin copolymer.

22. The method of claim 20, wherein the multiple layers include a polyethylene terephthalate glycol.

23. The method of claim 5, wherein the adhesive layers comprise at least one of ethylene ethyl acrylate and ethylene acrylic acid.

24. The method of claim 5, wherein the transparent barrier film further comprises a second inner nanolayer sequence including a plurality of nanolayers c) including a first low density polyethylene or linear low density polyethylene, alternating with nanolayers d) including a second low density polyethylene or linear low density polyethylene, wherein each of the nanolayers c) and d) has a degree of crystallinity less than about 45%.

25. The method of claim 5, wherein the amorphous polymer comprises a cyclic olefin polymer.

26. The method of claim 25, wherein the cyclic olefin polymer is present in both of the first and second outer layers.

27. The method of claim 5, wherein the amorphous polymer comprises polyethylene terephthalate glycol.

28. The method of claim 27, wherein the polyethylene terephthalate glycol is present in both of the first and second outer layers.

29. The method of claim 5, wherein the bottle comprises a body having a seamless cylindrical cross-section, a closed bottom end, a necked top end that is narrower than the body, and an opening in the necked top end.

30. The method of claim 5, wherein the bottle comprises a body having a seamless square or rectangular cross section, a closed bottom end, a necked top end that is narrower than the body, and an opening in the top end.

31. The method of claim 5, wherein the bottle has a seamless cross-section.

32. The method of claim 5, wherein the inner nanolayer sequence comprises at least three of the nanolayers a) and at least three of the nanolayers b).

33. The method of claim 5, wherein the inner nanolayer sequence comprises at least five of the nanolayers a) and at least five of the nanolayers b).

* * * * *